Figure 1:
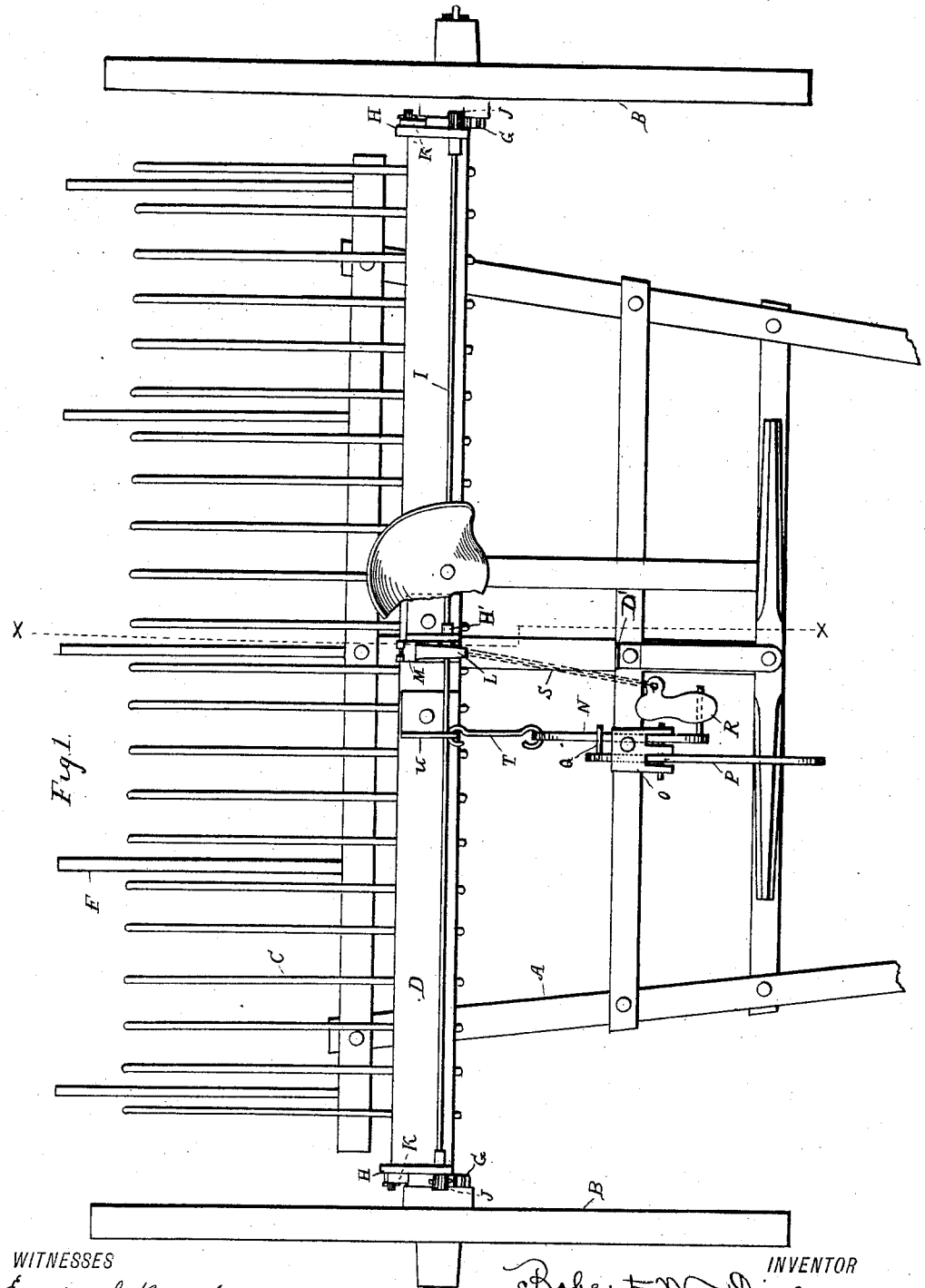

(No Model.)  2 Sheets—Sheet 1.

R. W. DIXON.
HORSE HAY RAKE.

No. 320,766. Patented June 23, 1885.

WITNESSES
Edwin L. Bradford
Morton Taulmin

INVENTOR
Robert W. Dixon.
By Toulmin & Lemmes
his Attorneys.

N. PETERS, Photo-Lithographer, Washington, D. C.

(No Model.)  2 Sheets—Sheet 2.
R. W. DIXON.
HORSE HAY RAKE.
No. 320,766. Patented June 23, 1885.
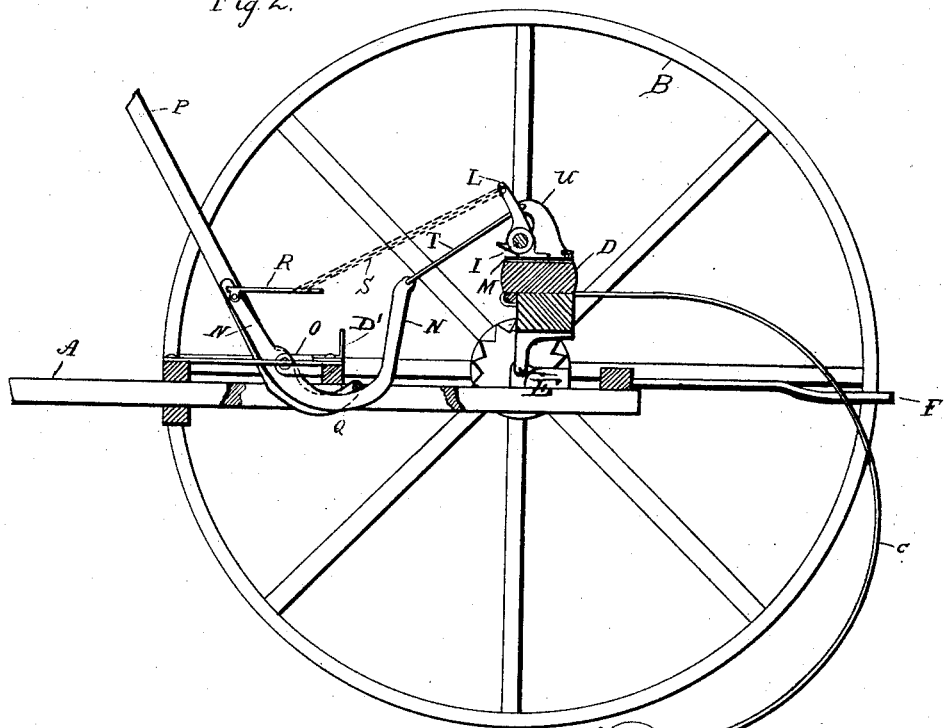
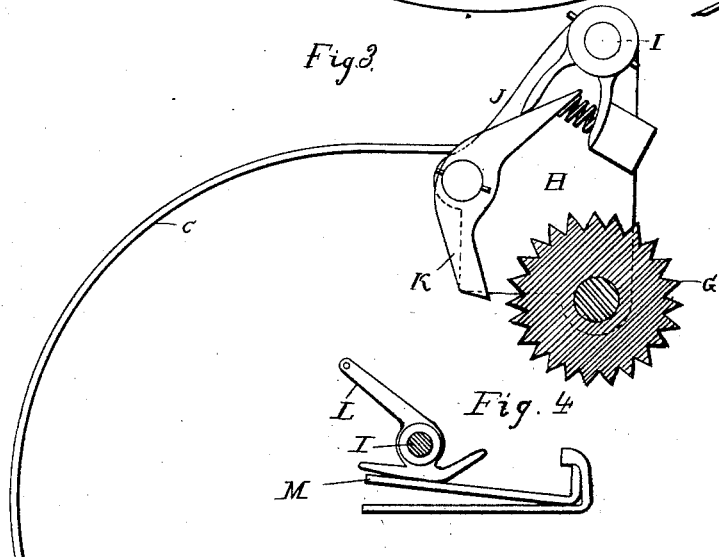
WITNESSES
Edwin L. Bradford
Morton Taulmin
INVENTOR
Robert W. Dixon,
By Taulmin & Jemmes,
his Attorneys.

UNITED STATES PATENT OFFICE.

ROBERT W. DIXON, OF SPRINGFIELD, OHIO, ASSIGNOR TO THE SPRINGFIELD MANUFACTURING COMPANY, OF SAME PLACE.

HORSE HAY-RAKE.

SPECIFICATION forming part of Letters Patent No. 320,766, dated June 23, 1885.

Application filed December 20, 1883. (No model.)

*To all whom it may concern:*

Be it known that I, ROBERT W. DIXON, a citizen of the United States, residing at Springfield, in the county of Clark and State of Ohio, have invented certain new and useful Improvements in Horse Hay-Rakes, of which the following is a specification, reference being had therein to the accompanying drawings.

This invention relates to certain new and useful improvements in horse hay-rakes, and it has special reference to that class known as "draft-dumpers," in which the momentum of the machine is utilized to elevate the rake-teeth; and it has for its objects, first, to provide a trip-lever to be actuated by the foot of the operator for the purpose of throwing into engagement the devices which cause the draft of the machine to dump the accumulated hay by elevating the rake-teeth; and, second, to provide a hand-lever, which shall act in conjunction with the trip-lever above alluded to, to elevate the rake-teeth in such a manner that the same will remain elevated.

In the accompanying drawings, forming a part of this specification, and on which like letters of reference indicate corresponding features, Figure 1 represents a plan-view of a horse hay-rake having my invention applied thereto; Fig. 2, a vertical section, taken on the line *x x* of Fig. 1; Fig. 3, a detached side elevation of the devices which elevate the rake-teeth by means of the forward movement of the machine, the axle and the ratchet-wheel being shown in cross-section; and Fig. 4 a detached enlarged side elevation of the rock-shaft arm and co-operating spring.

The letter A indicates the frame of a horse hay-rake of the ordinary or any approved construction, (the same being of that class in which the draft or forward movement of the machine is utilized to dump the load,) and is mounted upon the wheels B.

The letter C refers to the rake-teeth, secured in the usual manner to the rake-head D, the latter being pivotally connected at E to the frame of the machine. The usual teeth-clearers, F, are also secured to the machine. Each of the wheels is provided with a ratchet, G, which is adapted to revolve therewith. Mounted in the standards H and H', the former being secured to the axle and the latter to the upper side of the rake-head, is the rock-shaft I. This shaft is provided at either end with a bifurcated arm, J, having a recess containing a spring. A pawl, K, is pivoted to each of the standards H, and its upper end extends between the members of the bifurcated arm J, and its lower end is adapted to engage the ratchet-wheel G.

Rigidly secured to the rock-shaft I is a short arm, L, the lower end of which terminates in a slightly-curved foot. A spring, M, is located below the said foot. This spring serves to hold the arm L in either a backward or forward position by engaging with the forward or rear portion of the foot, the friction incident to this engagement of the spring with the foot of the arm effecting this holding of the latter.

The letter N refers to a curved trip-lever pivotally connected with any convenient part of the frame of the machine by means of the block O.

The letter P indicates the hand-lever, which is curved rearward at its lower end and extends upward a convenient height. This lever is swung on the same pivotal point as the trip-lever N, and is provided with a pin or extension, Q, at its lower curved end, which laps over the upper edge of the trip-lever for a purpose which shall presently appear.

Pivotally connected to the forward end of the trip-lever is a foot-piece, R, the pivotal point being located preferably near the toe. Near the heel of the foot-piece is connected a chain, S, the other end of which is fastened to the arm L on the rock-shaft I. The rear end of the trip-lever N is connected with the rake-head by means of the link T and the standard U.

When it is desired to dump a quantity of hay which has been gathered by the teeth, or to elevate them in order to pass over any obstruction, the operator places his foot upon the foot-piece R, depresses the heel, and thereby, through the chain S and arm L, rocks or slightly rotates the shaft I, thereby throwing the pawls K into engagement with the revolving ratchets G. This causes the momentum or forward movement of the machine to elevate the rake-teeth, the rake-head tipping forward on its pivotal points E until the arm L is arrested by a stop, D', secured to the frame of the machine. This engagement of the arm L and stop D' causes the former to rock the shaft I in the reverse direction, which in turn effects a disengagement of the pawls K from the ratchets G, thus permitting the rebound incident to this engagement to cause the rake-head to fly back again, bringing the teeth to their work.

When it is desired to elevate the tines for any length of time, the operator reaches forward, takes hold of the hand-lever P, and, drawing it toward him, raises the tines through the medium of the pin Q bearing upon the trip N, which is connected with the rake-head, as before described.

The position of the arm L shown in Fig. 4 is that which it assumes when pressure has been applied to the foot-piece R, and which it occupies when the pawls K are in engagement with the ratchets G. The spring M is also in the position which it assumes under these circumstances, and serves the purpose of preventing the shaft I from rotating or oscillating back to the position which it occupied before pressure was applied to the said foot-piece.

It is to be observed that by reason of pivoting the foot-piece R to the lever N the weight incident to this position of the foot is thrown upon the forward end of the lever N, thereby preventing the rear end of this lever from being depressed and allowing of the accidental raising of the rake-teeth should they meet with more than usual resistance. For instance, if some unusual resistance of the rake-teeth is experienced with a tendency to raise them up the arm U on the rake-head would be tilted forward; but, however, by the resistance of the rear end of the lever N and the interposed link T, connecting that lever with the arm U, such tilting of said arm is prevented. The pressure on the forward end of the lever N cannot throw the rear end forward, as the pin Q, on the lever P, resists the same, and, the movement of the lever P being itself limited, the said pin thus serves as such resistance to the lever N.

Having thus fully described my invention, what I claim as new, and desire to secure by Letters Patent, is—

1. In a hay-rake, the pivoted trip-lever and a foot-piece pivoted thereto and adapted to be connected with a rock-shaft which controls the engagement of pawls with ratchets fixed to the supporting-axle, said foot-piece being adapted to be actuated by the driver.

2. In a hay-rake, the pivoted trip-lever and the foot-piece pivoted thereto near its toe, and connected at its heel to a rock-shaft which controls the engagement of pawls with ratchets fixed to the supporting-axles.

3. In a hay-rake, the combination of the trip and hand levers having a common pivotal point, the one being adapted to be engaged by the other, and the trip-lever being connected with the rake-head and provided with a foot-piece pivoted thereto and connected with a rock-shaft which controls the engagement of pawls with ratchets fixed to the supporting-axle, whereby the rake-head is actuated to elevate the teeth.

4. In a hay-rake, the combination of a trip-lever and a hand-lever having a common pivotal point and adapted to engage each other, the trip-lever being provided with a pivoted foot-piece, the rake-head connected with the trip-lever, and the rock-shaft having an arm connected to the foot-piece, whereby the rake-tines may be elevated either by hand or by the draft of the machine.

In testimony whereof I affix my signature in presence of two witnesses.

ROBERT W. DIXON.

Witnesses:
CHASE STEWART,
P. J. CLEVENGER.